Aug. 10, 1954 R. L. PROBST 2,685,730
ARMATURE AND ARMATURE WEDGING MACHINE
Filed Oct. 21, 1948 2 Sheets-Sheet 1

INVENTOR
ROBERT L. PROBST
BY Alfred W. Petchaft
ATTORNEY

Aug. 10, 1954  R. L. PROBST  2,685,730
ARMATURE AND ARMATURE WEDGING MACHINE
Filed Oct. 21, 1948  2 Sheets-Sheet 2
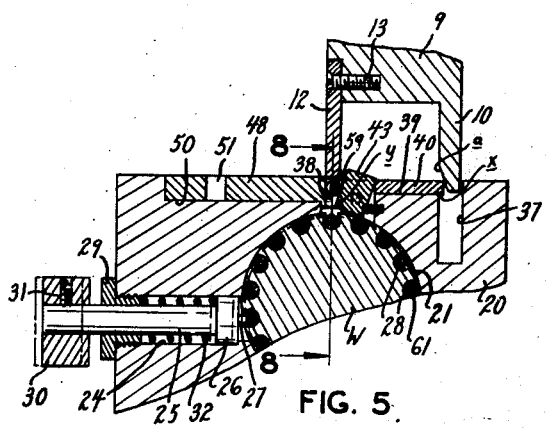
FIG. 5.
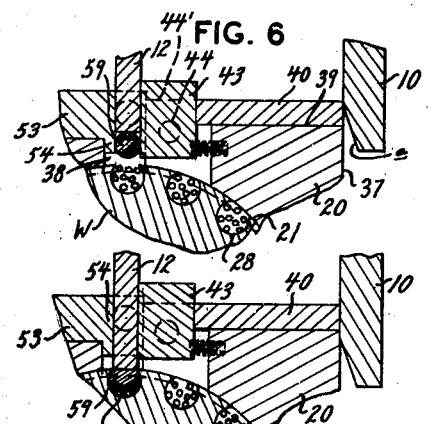
FIG. 6
FIG. 7
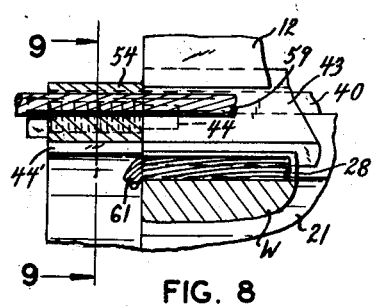
FIG. 8
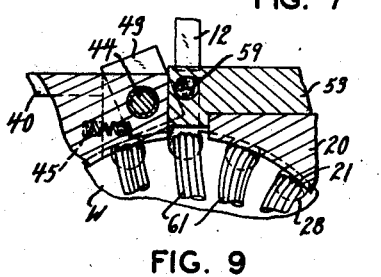
FIG. 9
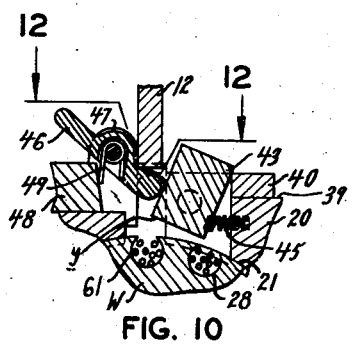
FIG. 10
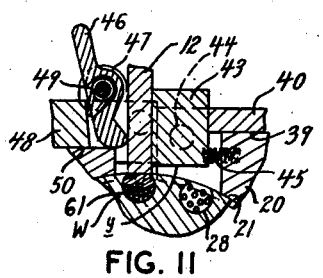
FIG. 11
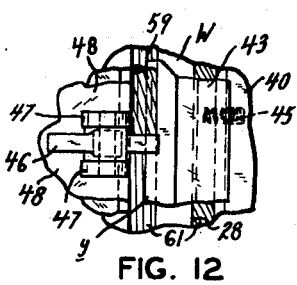
FIG. 12
INVENTOR
ROBERT L. PROBST
BY
ATTORNEY Patented Aug. 10, 1954

2,685,730

UNITED STATES PATENT OFFICE 2,685,730

ARMATURE AND ARMATURE WEDGING MACHINE

Robert L. Probst, Affton, Mo.

Application October 21, 1948, Serial No. 55,678

1 Claim. (Cl. 29—205)

This invention relates generally to armatures and armature wedging machines, and, more particularly, to certain new and useful improvements therein.

Heretofore, in manufacturing new armatures for small size electromotive generators and the like, as well as in repairing and rewinding such devices, it has been the practice to provide the armatures with so-called winding slots into which the windings are inserted. The slots are ordinarily much larger in cross sectional shape than the actual size of the winding plated therein, so that the winding, itself, occupies only a small proportion of the total slot. The use of over-size slots, as they may be called, materially facilitates the winding of the armature and is, in fact, almost necessary for this purpose, but once the winding is properly installed, it is necessary to introduce some retaining element into the slot to hold the winding in place, otherwise it would be loosened and ultimately pulled out of the slot by the great centrifugal forces imposed upon the winding when the armature is rotated upon the winding during actual use. Up to the present time it has been general practice to employ wooden wedging strips which are usually of somewhat semi-circular cross sectional shape and have a length substantially equal to the armature slot into which they are to be installed. Once the armature is wound a mechanic will place it in the suitable holding vise and will hammer a wedging strip into each slot on top of the winding, thereby wedging the winding tightly down into the bottom of the slot and holding it permanently in such position. Obviously, this operation is slow, time-consuming, and costly and the wooden wedging strips are comparatively expensive when considered against the total cost of an armature winding or rewinding operation.

In addition to this, the wooden wedging strips frequently crack, splinter, or break while being installed and must be laboriously removed so that an unbroken strip may be substituted and many times the wedging strip will splinter such a way as to injure the hands of the workman.

Finally, wooden wedging strips, by reason of their very nature, cannot be made in uniform sizes and shapes to a very high degree of mechanical tolerance and the amount of force used by the workman in hammering them in place can vary quite widely. Hence, the use of wedging strips results in a highly inaccurate installation which frequently requires that the armature be "trued" up or otherwise additionaly processed after the wedging operation has been completed.

It is, therefore, the primary object of the present invention to provide an armature wedging machine which will wedge the armature windings securely and tightly in place with a minimum of labor and cost.

It is a further object of the present invention to provide an armature wedging machine which performs the armature wedging operation in a fully mechanical manner making possible the achievement of a high degree of accuracy and speed in the performance of this type of work.

It is additionally an object of this invention to provide an armature wedging machine capable of wedging the armature with a cord-like wedging element which is uniform in size and shape and will not split or crack during installation and subsequent use.

It is also an object of the present invention to provide an armature wedging machine which is simple and economical in construction and is timely, precise, accurate and reliable in operation.

It is also an object of the present invention to provide a new and novel type armature in which the windings are wedged and held in place by a flexible, compressible and non-splintering wedging element.

And with the above and other objects in view, my invention resides in the novel features of form, construction, arrangement, and combination of parts presently described and pointed out in the claim.

In the accompanying drawings (two sheets)—

Figure 6 is a transverse sectional view taken along line 5—5 of Figure 4;

Figure 6 is a fragmentary enlarged sectional view similar to Figure 5 and illustrating the punch member at the point of impact with the wedging cord;

Figure 7 is an enlarged fragmentary sectional view similar to Figure 5 and showing the wedging cord being pressed within the armature slot by the punch member;

Figure 8 is a transverse sectional view taken along line 8—8 of Figure 5;

Figure 9 is a transverse sectional view taken along line 9—9 of Figure 8;

Figure 10 is a transverse sectional view taken along line 10—10 of Figure 4;

Figure 11 is an enlarged fragmentary sectional view similar to Figure 10 and showing the large means in channel clearing position; and Figure 12 is a transverse sectional view taken along line 12—12 of Figure 10.

Figure 1:
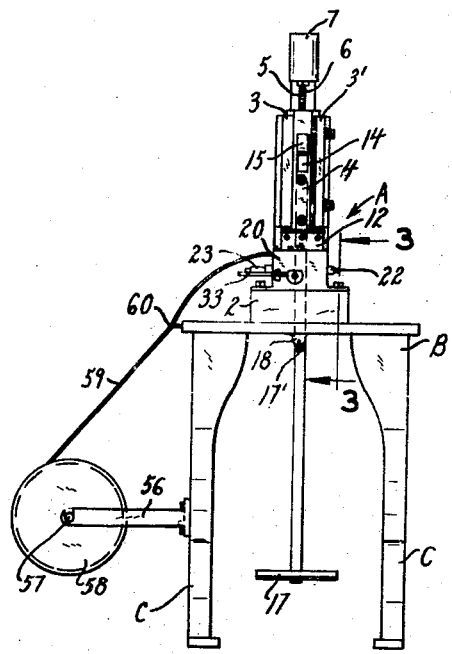
Figure 1 is a front elevational view of an armature wedging machine constructed in accordance with and embodying the present invention.
Figure 2:
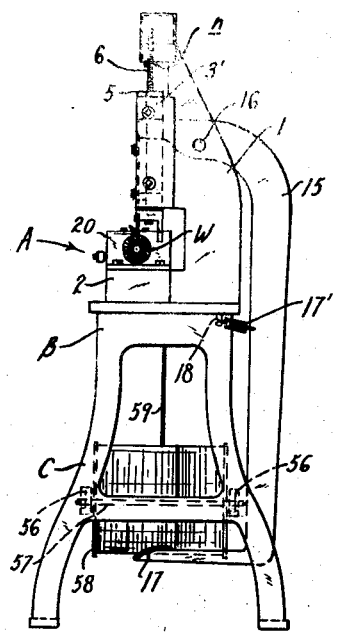
Figure 2 is a side elevational view.
Figure 3:
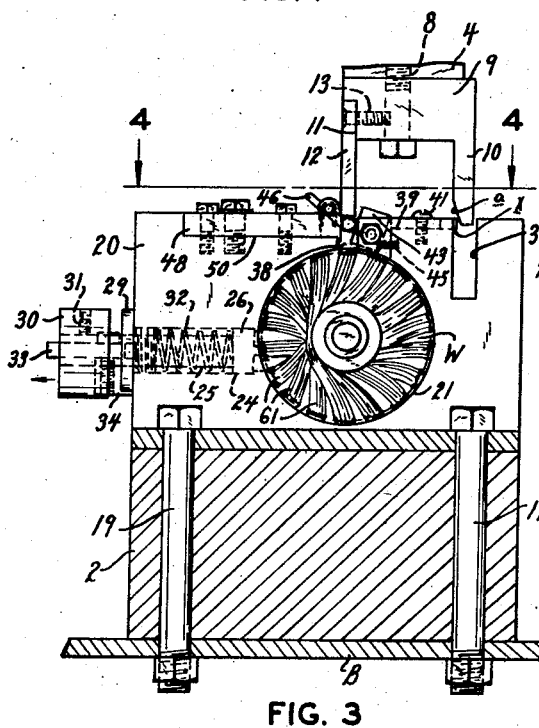
Figure 3 is a transverse sectional view taken along line 3—3 of Figure 1.
Figure 4:
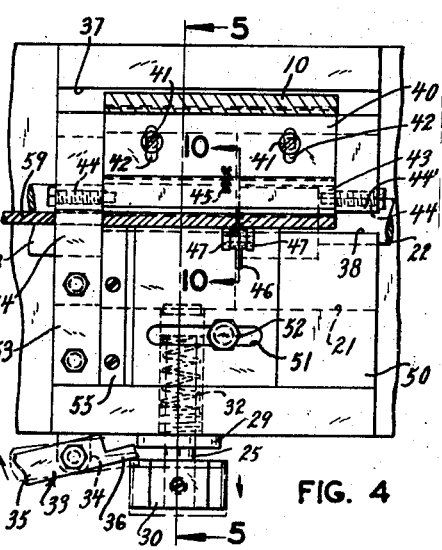
Figure 4 is a transverse sectional view taken along line 4—4 of Figure 3.

Referring now in more detail and by reference characters to the drawings, which illustrate a preferred embodiment of my present invention, A designates an armature wedging machine comprising a table or base structure B having legs C which flare outwardly in their lower portions. Bolted upon the top of the table B is an upstanding support member 1 having a platform 2 integral with its lower portion and an upper portion, in elevated relationship to the platform 2, provided with vertically disposed way-forming members 3, 3', for operatively supporting a vertically reciprocable slide 4, having a horizontal upper end face 5 for stop-wise abutment against the downwardly presented end of a threaded rod 6 screwed into a head block 7 formed integrally upon the upper end of the member 1. Intermediate its ends the rod 6 is provided with a lock nut $n$ which can be threaded up against the under face of the head block 7 to lock the rod 6 in any selected position of adjustment.

Attached by means of a bolt 8, to the lower end of the slide 4 is a tool-support member 9 integrally provided, along the rear margin of its under face, with a depending transverse flange 10, having a downwardly inclined cam face $a$. Along its forward face the member 9 is provided with a recess 11 for receiving the upper portion of a depending plunger-like tool 12 disposed in parallel relation to the flange 10 and held within the recess 11 by means of screws 13. In its upper portion the slide 4 is provided with an elongated vertically extending aperture 14 within which is operatively disposed the upper end of a C-shaped actuating lever 15 rockably mounted upon the member 1 by means of a horizontal pivot pin 16, and provided at its lower end with a pedal member 17 disposed a relatively short distance above the floor. The lower end of the actuating lever 15 is biased forwardly and the slide 4 thus held in upwardly shifted position by a tension spring 17' secured at one end to the lever 15 approximately midway its length, and secured at its other end to a depending lug 18 formed upon the underside of the table B. Secured upon the upper face of the platform 2 by bolts 19 is a jig-block 20 provided, approximately centrally, with a large horizontal armature receiving bore 21 opening at its ends upon the side faces of the jig-block 20 so that armature W may be readily slipped in from either side. The inside diametral size of the bore 21 is substantially equal to the outside diametral size of the armature W so that the latter may be freely rotated therein and slid longitudinally therethrough but will nevertheless be precisely positioned and held thereby. Furthermore, the jig-block 20 is slightly wider than the axial length of the body of the armature W so that only the armature shaft 22 and the commutator segments 23 thereof will project laterally therefrom when the armature W is properly seated within the bore 21. Obviously, different jig-blocks 20 must be made for each different size and type of armature.

The jig-block 20 is further provided with a circular rearwardly extending bore 24, perpendicularly disposed to, and opening at its inner end into, the bore 21. Slidably disposed within the bore 24 is a plunger rod 25 rigidly provided at its inner end with a concentric plunger head 26 sized for snug-fitting slidable disposition within the bore 24 and being, in turn, provided upon its inwardly presented end with a horizontally projecting tongue 27 for position-locating engagement in any one of the winding slots 28 of the armature W. The plunger rod 25 projects slidably through, and is supported by, a bushing 29 threadedly disposed in the bore 24, and at its outer or projecting end is provided with a knurled knob 30 held in place thereon by a set screw 31. Coiled about the plunger rod 25 and disposed endwise abuttingly between the inner faces of the bushing 29 and the plunger head 26 is a compression spring 32 for biasing the plunger rod 25 inwardly toward the bore 21.

A manually operable locking member 33 is pivotally mounted on a lug 34 extending from the face of the block 20, said member 33 having a handle 35 and a reduced end portion 36 adapted to abut against the inner face of the knob 30 when the handle 35 is swung inwardly toward the block 20. By such action, the plunger rod 25 is pulled outwardly causing the tongue 27 thereof to be retracted from the winding slot 28. When the handle 35 is released, it will swing outwardly and the reduced end 36 will move inwardly maintaining surface contact with the inner face of the knob 30. The plunger rod 25 will thus slide inwardly until its tongue 27 enters a winding slot 28 aligned therewith, to maintain the armature W in stationary position for reasons more fully appearing hereinafter.

On its upper face and adjacent its rear margin the block 20 is provided with a relatively deep slot 37 and forwardly thereof is a guide slot 38 opening into the bore 24 and being positioned precisely in radial alignment therewith. The slots 37 and 38 are furthermore located to receive the flange 10 and plunger-like tool 12 respectively, on downward movement of the slide 4 through operation of the lever 15.

Between the slot 37 and the slot 38, the block 20 is provided with a shallow rectangular recess 39 within which a plate 40 is slidably disposed and operably held in place by means of screws 41 extending through slot-like apertures 42 and threadedly secured at their lower ends in the block 20. One longitudinal margin of the plate 40 is in surface abutting contact with the upper portion of one face of a gate block 43 rockably mounted within the recess 39 by means of pins 44 engaged at their ends in upstanding rim sections 44' of the block 20 and biased as shown in Figure 10 by means of springs 45. As a result of the abutment between the gate-block 43 and one margin of the plate 40, the opposite margin of the plate 40 normally extends into the upper end of the slot 37 a short distance as at $x$.

The gate-block 43 is normally tilted by the spring 45 so that its outer lower portion $y$ is disposed within the bore 21 having its outer face in abutting relationship with the inner end of a dog 46, rockably mounted between spaced upstanding ears 47 formed on the inner portion of a rectangular plate 48 and being biased by a hair-pin spring 49.

The plate 48 is slidably disposed within a relatively large shallow recess 50 provided in the upper face of the block 20 on the opposite side of the bore 21 from the recess 39, said plate 48 being provided with an elongated aperture 51 through which extends a bolt 52 threadedly engaged at its lower end in a suitable aperture in the block 20. It is thus to be seen that the length of the aperture 51 determines the distance through which the plate 48 may be optionally moved, whereby the dog 46 will be accordingly placed at various positions in the slot 38. Also disposed within the recess 50, at one end thereof is a shear plate 53 secured on the upper face of the block 20 and having one of its ends extending over the bore 21 in the provision of a shear block 54.

Secured in the recess 50 between the shear plate 53 and the plate 48 is a relatively narrow spacing block 55 abutting along one of its transverse margins against the adjacent margin of the shear plate 53, and its opposite margin against one margin of the plate 48, acting thus as a limit to the travel of the plate 48 in one direction.

Secured to each of the rear legs C of the table B and extending rearwardly therefrom is a support arm 56 which support at their outer ends a shaft 57 extending therebetween. Loosely encirclingly mounted on said shaft 57 is a spool 58 of twisted paper, cord, or similar dielectric material 59, the free end of which is threaded through a guide 60 secured to the top of the table B, into the slot 38, of the block 20, beneath the inner end of the shear plate 53 and thence forwardly until it abuts against the dog 46, whereupon the machine A is ready for operation.

In use the operator may pull the handle 33 back retracting the tongue 27 and insert an armature W axially with the bore 21, whereupon the handle 33 is released and the armature held in position for wedging, a section of cord 59 is manually fed into the slot 38 until it comes to rest against the stop dog 46. The pedal 17 is then depressed, moving the lever 15 downwardly and causing the upper end thereof to move correspondingly downwardly within the aperture 14 permitting the arm 4 to drop downwardly within the ways 3, 3', whereby the flange 10 enters the slot 38. Simultaneously with such movement, the cord 59 is severed by shearing action between the end face of the plunger 12 and the adjacent face of the shear block 54 into a section having a length equivalent to the length of the winding slots 28 of the armature W and which is momentarily supported in the slot 38 by the gate block 43. Thereupon the cam face *a* of the flange 10 contacts the extended margin of the plate 40, and causes the plate 40 to slide forwardly as the flange 10 enters the slot 38. By such sliding action, the outer margin of the plate 40 forces the gate block 43 to pivot into upright position causing the portion *y* to be withdrawn from the slot 38 and the path of the downward moving plunger 12, which upon entering the bore 24 abuts against the upper face of the dog 46 and causes it to be pivoted out of the path of the tool 12, while applying a controlled amount of compression squeeze to the severed length of cord as it is forced into the armature slot by continued downward movement of the plunger 12, all as may best be seen in Figures 10 and 11. The cord 59 is thus pressed into selected armature 28 in overlying and retentive relation to the winding 61.

Upon completion of the downward stroke the operator releases the pedal 16 to raise the lever 15 whereupon the flange 10 and plunger 12 are withdrawn upwardly from the slot 37 and the slot 38.

Upon this withdrawal of the flange 10 and plunger 12 the dog 46 through action of the spring 49 is swung upwardly into the slot 38, with its end face abutting the gate block 43, the gate block 43, in turn, causes the plate 40 to slide inwardly and have its end margin extend into the upper part of the slot 37. Whereupon the free end of the cord 59 may be pushed into the slot 38. The operator next withdraws the plunger rod 25 by means of the locking member 33, above described. The armature W is then manually rotated so that the next succeeding winding slot 28 is in alignment with the slot 38 for receiving the section of cord 59. It is to be noted that the bore 24 is spaced from the slot 38 so that when one of the winding slots 28 is in alignment with the bore 24, another winding slot 28 will be aligned with the slot upon release of the locking device 33, the tongue 27 of the plunger rod 25 will enter the particular slot 28 aligned with the bore 24 and thus retain the armature W in steady position for the wedging operation.

The length of the severed section of the cord 59 is regulated by adjustment of the plate 49 and inserting of one or more spacing blades 55 of suitable widths so that the dog 46 will be properly positioned to permit the desired length of cord to extend into the slot 38 prior to shearing action above described.

It should be understood that changes and modifications in the form, construction, arrangement, and combination of the several parts of the armature winding machine may be made and substituted for those herein shown and described without departing from the nature and principle of my invention.

Having thus described my invention, what I claim and desire to secure by Letters Patent is:

A machine for installing wedging elements within the winding slots of an armature in overlying relationship upon the windings, said machine comprising a jig-block having a relatively large bore for retaining an armature therein, said jig-block having a slot extending radially outwardly from and axially along the periphery of the bore, a shear block extending over a portion of the slot, said shear block having a downwardly presented flat face and a laterally presented shearing face, said shear block further being provided with a tubular passage parallel to the slot for slidably receiving a cord-like strand of wedging material, said slot opening upon the laterally presented face in the provision of an aperture, an arm vertically disposed above the slot, a plunger member secured at the lower end of the arm, means for reciprocating said arm for moving the plunger member into the slot, said plunger member having a laterally presented face adapted to slide against the laterally presented face of the shear block and across the aperture thereof, whereby the shearing face of said plunger member cooperating with the edges of the aperture will sever a section of the wedging material and the severed section will drop into the slot directly beneath the flat face of said plunger, the latter, upon continued downward movement into the slot, forcing the severed section of the wedging material into a winding slot of the armature, and a horizontally pivoted gate-block mounted in and extending along one side of the slot, said gate-block having an inwardly presented flat face and being spring biased below its pivot so that its lower margin will be swung outwardly into the slot in downwardly spaced relation to the lowermost point of the aperture and its flat face will be presented angularly downwardly and inwardly so as to form a downwardly converging constriction in the slot adapted to catch the wedging material as it is severed, said pivoted gate-block further being so positioned as to be swung outwardly with respect to the slot by the plunger as it moves downwardly so that the gate-block will not interfere with downward movement of said plunger.

References Cited in the file of this patent

UNITED STATES PATENTS

| Number | Name | Date |
|---|---|---|
| 128,817 | Schoettle | July 9, 1872 |
| 1,402,217 | Cullin | Jan. 3, 1922 |
| 1,479,248 | Moore | Jan. 1, 1924 |
| 1,487,302 | Willis | Mar. 18, 1924 |
| 1,556,893 | Ahlers | Oct. 13, 1925 |
| 1,838,017 | Eaton | Dec. 22, 1931 |
| 1,891,200 | Eaton | Dec. 13, 1932 |
| 1,980,170 | Eaton | Nov. 13, 1934 |
| 1,949,739 | Eaton | Mar. 6, 1934 |
| 2,056,534 | Poole | Oct. 6, 1936 |
| 2,111,457 | McCaffrey | Mar. 15, 1938 |
| 2,204,736 | Straubel | June 18, 1940 |
| 2,205,822 | Poole | June 25, 1940 |
| 2,305,273 | Poole et al. | Dec. 15, 1942 |
| 2,390,897 | Poole | Dec. 11, 1945 |
| 2,492,911 | Williams | Dec. 27, 1949 |